(12) United States Patent
Shao et al.

(10) Patent No.: US 12,299,645 B2
(45) Date of Patent: May 13, 2025

(54) METHODS AND INTERNET OF THINGS SYSTEMS FOR MANAGING SAFETY MAINTENANCE OF APPURTENANCES OF SMART GAS PIPELINE NETWORK

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Xiaojun Wei, Chengdu (CN); Feng Wang, Chengdu (CN); Lilong Su, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/739,310

(22) Filed: Jun. 10, 2024

(65) Prior Publication Data
US 2024/0330872 A1    Oct. 3, 2024

(30) Foreign Application Priority Data
May 17, 2024    (CN) .......................... 202410616153.2

(51) Int. Cl.
*G06Q 10/20*    (2023.01)
*F17D 3/01*    (2006.01)
(Continued)

(52) U.S. Cl.
CPC ............... *G06Q 10/20* (2013.01); *F17D 3/01* (2013.01); *F17D 5/005* (2013.01); *G16Y 10/35* (2020.01);
(Continued)

(58) Field of Classification Search
None
See application file for complete search history.

(56) References Cited

U.S. PATENT DOCUMENTS

2023/0228364 A1    7/2023  Shao et al.

FOREIGN PATENT DOCUMENTS

| CN | 108629718 A | 10/2018 |
|---|---|---|
| CN | 113486494 A | 10/2021 |
| CN | 113971522 A | 1/2022 |

OTHER PUBLICATIONS

Yu, Yue, Research and Development of GIS-based Early Warning System for Urban Gas Network Information Management, China Plant Engineering, 2023, 4 pages.
(Continued)

*Primary Examiner* — Mohammad Ali
*Assistant Examiner* — Saad M Kabir
(74) *Attorney, Agent, or Firm* — METIS IP LLC

(57) ABSTRACT

The method includes: obtaining at least one of gas data and pipeline data based on a gas device object platform; assessing a health state of the appurtenances based on at least one of the gas data and the pipeline data; the health state including at least one of a drainer state and a compensator state; determining at least one maintenance parameter of the appurtenances based on the health state; dynamically adjusting at least one transportation parameter of gas based on the health state and the at least one maintenance parameter; sending at least one adjusted transportation parameter to a gas operation user platform; and determining a maintenance program based on the at least one maintenance parameter, and the at least one adjusted transportation parameter, and uploading the maintenance program to a government safety supervision and management platform.

5 Claims, 6 Drawing Sheets

(51) Int. Cl.
  *F17D 5/00*   (2006.01)
  *G16Y 10/35*  (2020.01)
  *G16Y 40/20*  (2020.01)
  *G16Y 40/40*  (2020.01)
  *G16Y 40/50*  (2020.01)

(52) U.S. Cl.
  CPC .............. *G16Y 40/20* (2020.01); *G16Y 40/40* (2020.01); *G16Y 40/50* (2020.01)

(56) References Cited

OTHER PUBLICATIONS

Michael Chertkov et al., Cascading of fluctuations in interdependent energy infrastructures: Gas-grid coupling, Applied Energy, 160: 541-551, 2015.

Notification to Grant Patent Right for Invention in Chinese Application No. 202410616153.2 mailed on Jun. 26, 2024, 6 pages.

METHODS AND INTERNET OF THINGS SYSTEMS FOR MANAGING SAFETY MAINTENANCE OF APPURTENANCES OF SMART GAS PIPELINE NETWORK

CROSS REFERENCE TO RELATED APPLICATIONS

This application claims priority to Chinese Patent Application No. 202410616153.2, filed on May 17, 2024, the entire contents of which are incorporated herein by reference.

TECHNICAL FIELD

The present disclosure relates to a field of gas safety, and in particular relates to a method for managing safety maintenance of appurtenances of a smart gas pipeline network.

BACKGROUND

Gas, as a clean energy source, is used more and more widely in industrial production and people's daily lives. In a process of gas use, due to a high use frequency of use, all kinds of faults or abnormalities may occur to a gas pipeline network system, which poses a greater challenge a great challenge for a detection and maintenance for the gas pipeline network system. Therefore, it has become an urgent problem about how to ensure that a use safety of the gas pipeline network system.

CN113486494A provides a gas pipeline state monitoring decision-making method and system. In the method, Information about the gas pipeline is extracted based on gas pipeline data to realize the pipeline state monitoring of the gas pipeline. At the same time, the pipeline state of the gas pipeline is quickly decided to realize a residual strength and residual life evaluation of various defects of the gas pipeline, which provides information and a decision-making support for an implementation of pipeline safety management.

The above method does not involve a solution strategy for a hidden safety hazard during the use of gas pipeline network device, therefore, it is necessary to put forward a kind of intelligent means to carry out a comprehensive and reliable assessment on a maintenance work of different appurtenances, so as to avoid an influence on gas operation safety and efficiency due to an insufficient maintenance work influence.

SUMMARY

One of the embodiments of the present disclosure provides a method for managing safety maintenance of appurtenances of a smart gas pipeline network. The method for managing safety maintenance of appurtenances of the smart gas pipeline network may include: obtaining at least one of gas data and pipeline data based on a gas device object platform; assessing a health state of the appurtenances based on at least one of the gas data and the pipeline data; the health state including at least one of a drainer state and a compensator state; determining at least one maintenance parameter of the appurtenances based on the health state; dynamically adjusting at least one transportation parameter of gas based on the health state and the at least one maintenance parameter; sending at least one adjusted transportation parameter to a gas operation user platform; and determining a maintenance program based on the at least one maintenance parameter and the at least one adjusted transportation parameter, and uploading the maintenance program to a government safety supervision and management platform.

One of the embodiments of the present disclosure provides a system for managing safety maintenance of appurtenances of a smart gas pipeline network. The system for managing safety maintenance of appurtenances of a smart gas pipeline network may include: a gas operation user platform, a gas user service platform, a government safety supervision and management platform, a gas company management platform, a gas company sensor network platform, and a gas device object platform. The gas company management platform may include a data processing center and a data storage center. The data processing center may be configured to: obtain at least one of gas data and pipeline data based on the gas device object platform; assess a health state of the appurtenances based on at least one of the gas data and the pipeline data; the health state including at least one of a drainer state and a compensator state; determine at least one maintenance parameter of the appurtenances based on the health state; dynamically adjust at least one transportation parameter of gas based on the health state and the at least one maintenance parameter; send at least one adjusted transportation parameter to the gas operation user platform; and determine a maintenance program based on the at least one maintenance parameter and the at least one adjusted transportation parameter, and upload the maintenance program to the government safety supervision and management platform.

One of the embodiments of the present disclosure provides a non-transitory computer-readable storage medium storing computer instruction. When reading the computer instructions in the storage medium, a computer may execute the method for managing the safety maintenance of appurtenances of a smart gas pipeline network.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same counting denotes the same structure, wherein.

DETAILED DESCRIPTION

Figure 1:
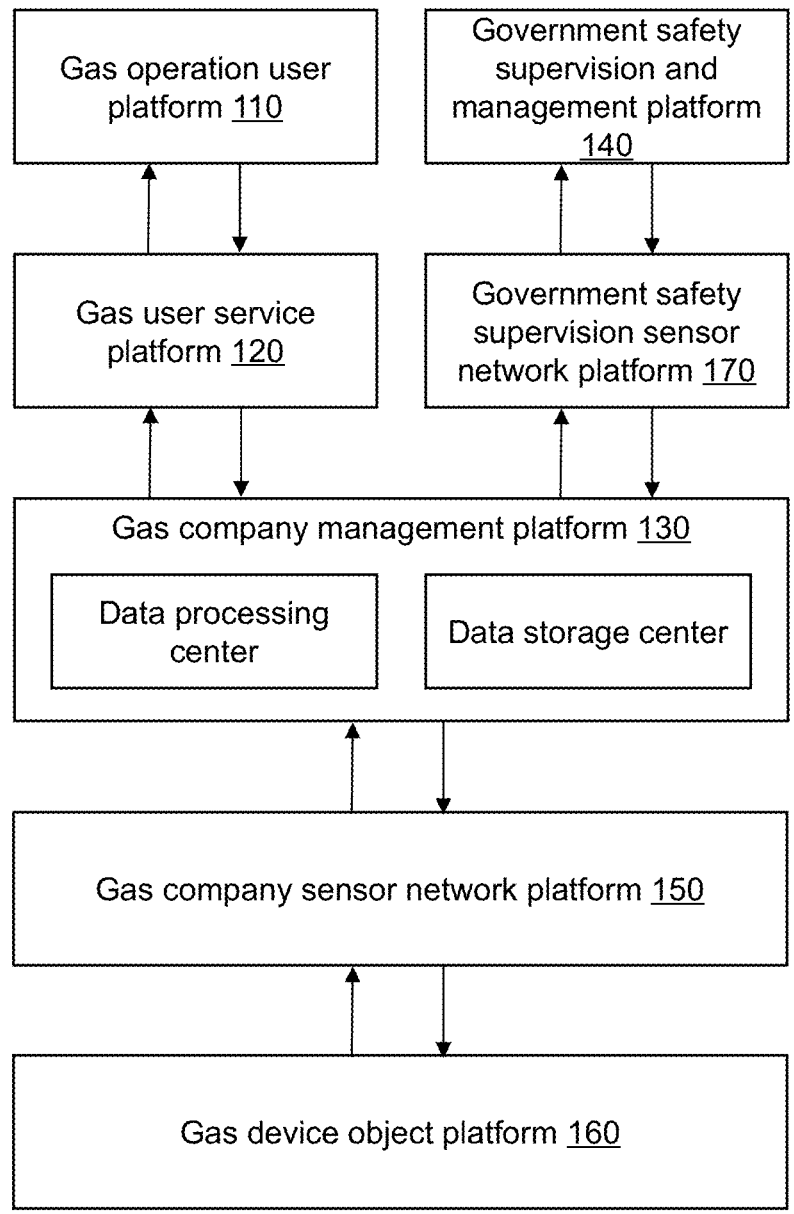
FIG. 1 is a diagram illustrating an exemplary platform structure of a system for managing safety maintenance of appurtenances of a smart gas pipeline network according to some embodiments of the present disclosure.

In order to more clearly illustrate the technical solutions of the embodiments of the present disclosure, the following will briefly describe the accompanying drawings to be used in the description of the embodiments. Obviously, the accompanying drawings in the following description are only some examples or embodiments of the present disclosure, and it is possible for those skilled in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "device," "unit," and/or "module" as used herein is a way to distinguish between different components, elements, parts, sections, or assemblies at different levels. However, the words may be replaced by other expressions if other words accomplish the same purpose.

As shown in the present disclosure and the claims, unless the context clearly suggests an exception, the words "a," "an," and/or "the" do not refer specifically to the singular, but may also include the plural. Generally, the terms "including" and "comprising" suggest only the inclusion of clearly identified steps and elements that do not constitute an exclusive list, and the method or apparatus may also include other steps or elements.

Flowcharts are used in the present disclosure to illustrate operations performed by a system according to embodiments of the present disclosure. It should be appreciated that the preceding or following steps are not necessarily performed in an exact sequence. Instead, steps may be processed in reverse order or simultaneously. Also, it is possible to add other operations to these processes, or to remove a step or steps from these processes.

FIG. 1 is a diagram illustrating an exemplary platform structure of a system for managing safety maintenance of appurtenances of a smart gas pipeline network according to some embodiments of the present disclosure; The system for managing safety maintenance of appurtenances of a smart gas pipeline network covered by embodiments of the present disclosure is described in detail below. It should be noted that the following embodiments are used only to explain the present disclosure and do not constitute a limitation of the present disclosure.

In some embodiments, an Internet of Things (IoT) system for managing safety maintenance of appurtenances of a smart gas pipeline network 100 may include a gas operation user platform 110, a gas user service platform 120, a gas company management platform 130, a government safety supervision and management platform 140, a gas company sensor network platform 150, and a gas device object platform 160.

In some embodiments, the gas operation user platform 110 refers to a platform for interacting with an operation user. In some embodiments, the gas operation user platform 110 may be configured as a terminal device.

In some embodiments, the gas operation user platform 110 may perform a data interaction with the gas user service platform 120. For example, the gas operation user platform may receive at least one maintenance parameter, and at least one adjusted gas transportation parameter from the gas user service platform, and the gas operation user platform may control the operation of the gas pipeline network based on the relevant parameters. For another example, the gas operation user platform may send a data obtaining request to the gas user service platform to obtain the aforementioned maintenance parameter and the gas transportation parameter.

In some embodiments, the gas user service platform 120 may be configured to provide information related to a gas pipeline network operation.

In some embodiments, the gas user service platform 120 may perform the data interaction with a plurality of parties. For example, the gas user service platform may receive the at least one maintenance parameter and the at least one adjusted gas transportation parameter sent by the gas company management platform 130, and send the foregoing parameters to the gas operation user platform; and for another example, the gas user service platform may send a maintenance instruction to relevant personnel to perform maintenance on an appurtenance of a gas pipeline network based on the maintenance parameter, etc.

In some embodiments, the gas company management platform 130 is used for overall planning and coordinating connections and cooperation among various functional platforms, gathering all information of the IoT system, and providing functions of perceptual management and control management for the IoT operation system.

In some embodiments, the gas company management platform 130 may include a data processing center and a data storage center.

The data storage center may be configured to store various data generated during the operation of the gas pipeline network as well as during the operation process. The data may include, but not limited to, gas data, pipeline data, maintenance data of the appurtenances, the maintenance parameter, etc.

The data processing center may determine a health state of the appurtenances based on the data stored in the data storage center and manage and maintain the appurtenances.

In some embodiments, the gas company management platform may, through the data processing center and the data storage center, respectively, perform an information interaction with the gas user service platform 120, the government safety supervision and management platform 140, and the gas company sensor network platform 150. For example, the data processing center may determine the maintenance parameter and the gas transportation parameter, store the aforementioned parameters in the data storage center and/or send them to the gas user service platform 120; and for another example, the gas company management platform 130 may determine safety supervision demand information based on a maintenance plan and send the safety supervision demand information to the government safety supervision and management platform 140; and for another example, the gas company management platform 130 may generate a data instruction and send the data instruction to the gas company sensor network platform 150, or send the data instruction to the gas device object platform 160 through the gas company sensor network platform 150 to obtain relevant data.

In some embodiments, the government safety supervision and management platform 140 may be configured to meet the needs of governmental users for supervision of the operation of a gas pipeline network.

In some embodiments, the government safety supervision and management platform 140 may obtain safety supervision demand information uploaded by the gas company management platform 130 to enable a government safety supervision user to perform approval and safety supervision on the relevant operations.

In some embodiments, the gas company sensor network platform 150 may be configured to manage sensor communications. In some embodiments, the gas company sensor network platform 150 may perform functions of perceptual information sensor communication and controlling information sensor communication.

In some embodiments, the gas company sensor network platform may be in a bi-directional communication with the gas device object platform to receive data obtained by the gas device object platform 160. In some embodiments, the gas company sensor network platform 150 may receive data information obtained by the gas device object platform 160 and upload the data information to the gas company management platform 130.

In some embodiments, the gas device object platform 160 may be a functional platform for sensor information generation and controlling information execution, and may include a flow meter, a pitcometer, a barometric pressure sensor, a temperature sensor, a humidity sensor, gas-sensitive sensor, a stress sensor, etc. installed in the gas pipeline network.

In some embodiments, the gas device object platform 160 may obtain the gas data and the pipeline data, and upload them to the gas company management platform 130 via the gas company sensor network platform 150.

In some embodiments of the present disclosure, based on the IoT system for managing the safety maintenance of appurtenances of the smart gas pipeline network 100, it may be coordinated and operated in a regular manner under the unified management of the gas company management platform to carry out a standardized maintenance of the gas appurtenances, and realize the appurtenances maintenance informationization and intellectualization.

In some embodiments, the platform in the IoT system for managing the safety maintenance of appurtenances of the smart gas pipeline network 100 may be divided into a smart gas primary network and a smart gas secondary network. The smart gas primary network refers to a network in which a government user regulates the operation of a gas pipeline network, and the smart gas secondary network may include a network in which the gas pipeline network operates. In some embodiments, the IoT system for managing the safety maintenance of appurtenances of the smart gas pipeline network 100 may play different roles in the smart gas primary network and the smart gas secondary network.

In some embodiments, the smart gas primary network may at least include a smart gas primary network management platform, a smart gas primary network sensor network platform, and a smart gas primary network object platform. The smart gas primary network management platform may include the government safety supervision and management platform 140, the smart gas primary network sensor network platform may include a government safety supervision sensor network platform 170, and the smart gas primary network object platform may include the gas company management platform 130.

In some embodiments, the smart gas secondary network may at least include a smart gas secondary network user platform, a smart gas secondary network service platform, a smart gas secondary network management platform, a smart gas secondary network sensor network platform, and a smart gas secondary network object platform. The smart gas secondary network user platform may include the gas operation user platform 110 and the government safety supervision and management platform 140, the smart gas secondary network service platform may include the smart gas user service platform 120, the smart gas secondary network management platform may include the gas company management platform 130, the smart gas secondary network sensor network platform may include the gas company sensor network platform 150, and the smart gas secondary network object platform may include the gas device object platform 160.

For more details on the execution of the functions of the IoT system for managing the safety maintenance of appurtenances of the smart gas pipeline network 100, please refer to the relevant descriptions in FIG. 2-FIG. 6 of the present disclosure.

It should be noted that the above description of the IoT system for managing the safety maintenance of appurtenances of the smart gas pipeline network is provided only for descriptive convenience, and does not limit the present disclosure to the scope of the cited embodiments.

Figure 2:
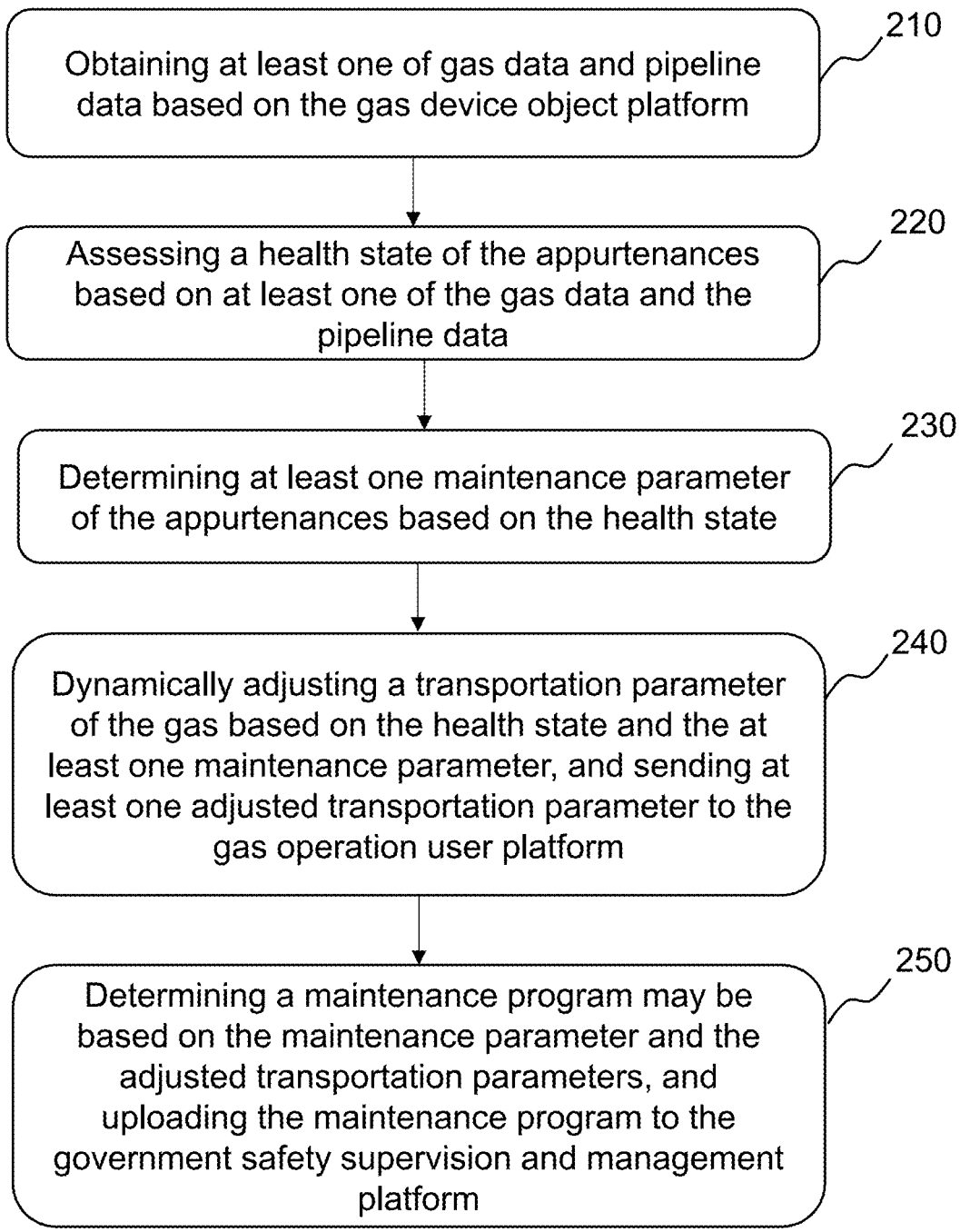
FIG. 2 is a flowchart illustrating an exemplary method for managing safety maintenance of appurtenances of a smart gas pipeline network according to some embodiments of the present disclosure.

FIG. 2 is a flowchart illustrating an exemplary method for managing safety maintenance of appurtenances of a smart gas pipeline network according to some embodiments of the present disclosure. As shown in FIG. 2, a process 200 may include the following steps. In some embodiments, the process 200 may be performed by a data processing center of the gas company management platform 130.

Step 210, at least one of gas data and pipeline data may be obtained based on the gas device object platform 160.

The gas data refers to data related to gas. In some embodiments, the gas data may at least include gas transportation data, gas temperature data, gas humidity data, and gas composition data. The gas transportation data refers to a flow volume, a flow rate, a transportation pressure, etc. of the gas as the gas is transported along a pipeline. The gas temperature data refers to the a temperature detected through a temperature sensor. The gas humidity data refers to a gas humidity detected through a humidity sensor. The gas composition data refers to a gas composition detected through the gas composition sensor.

The pipeline data refers to data related to a gas transportation pipeline. In some embodiments, the pipeline data may at least include pipeline basic data, pipeline stress data, etc. The pipeline basic data may include a pipeline length, a pipeline diameter, a pipeline material, etc. The pipeline stress data refers to stress data at a pipeline joint due to thermal expansion and contraction, which is obtained through the stress sensor on the pipe.

In some embodiments, the gas company management platform 130 may obtain the gas data and the pipeline data through the gas device object platform 160. For example, the gas humidity sensor may upload the gas data to the gas device object platform. In some embodiments, the gas company management platform 130 may store the gas data obtained by the gas device object platform to a smart gas data center.

Step 220, a health state of the appurtenances may be assessed based on at least one of the gas data and the pipeline data.

The health state of the appurtenances refers to the state condition of the device of the appurtenances. The appurtenances refers to necessary ancillary devices set up in the gas pipeline network to meet the needs of maintenance and wiring. For example, drains, compensators, etc. The drainer may be set at a low point of the gas pipeline for removing water from the gas pipeline or periodically draining a condensate liquid from the pipeline; the compensator may be set on an overhead pipeline and the pipeline that needs to be purged by steam to compensate for the thermal expansion and contraction of the pipelines or to facilitate a removal of valves during maintenance.

In some embodiments, the health state of the appurtenances may include at least one of a drainer state and a compensator state.

The drainer state refers to status information such as an operating status of the drainer and the status of the hardware, etc. The drainer may be installed at the low point in the gas line to remove the water that enters the gas pipeline.

The compensator state refers to status information such as the operating status of the compensator and the status of the hardware, etc. The compensator may be installed on the overhead pipeline and pipeline that requires steam blowing to compensate for the thermal expansion and contraction of pipeline.

In some embodiments, the drainer state and the compensator state may be expressed by a percentage, respectively, with a higher percentage indicating a better health drainer state and/or compensator.

In some embodiments, the data processing center may determine the health state of the appurtenances based on values of the drainer state and the compensator state. For example, the health state of the appurtenances may be determined by a weighted summation based on the values of the drainer state and the compensator state. Weights of the weighted summation may be determined based on actual needs.

In some embodiments, the data processing center may determine the health state of the appurtenances through the data obtained by the gas device object platform.

In some embodiments, the data processing center may determine the drainer state by analyzing a field gas data of the appurtenances. For example, the data processing center may read the field gas data of the appurtenances, the aforesaid field gas data including the gas data detected by the gas device object platform that meets a preset condition with the appurtenances, such as upstream gas data, downstream gas data, etc.; the data processing center may determine the drainer state based on a difference of the gas humidity data and the difference of impurities in the composition in the upstream gas data and the downstream gas data, and the smaller the difference, the worse the drainer state. The preset condition may be the closest distance between the gas device object platform and the appurtenances.

In some embodiments, the data processing center may determine the compensator state by analyzing the stress data at the gas pipeline joint. For example, the greater the stress data at the gas pipeline joint, the more severe a squeeze between the pipelines, and the worse the compensator state.

In some embodiments, the data processing center may determine an operating load of the appurtenances based on at least one of the gas data and the pipeline data; and determine the health state of the appurtenances based on the foregoing operating load.

The operating load refers to an amount of tasks that need to be done to maintain a normal operation of the device. The operating load of the appurtenances may include a draining load of the drainer, a compensating load of the compensator.

The draining load refers to the load brought to a work of the drainer by discharging the water in the gas so that the gas reaches a target gas humidity. The target gas humidity may generally be maintained at a stable level, and the higher the gas humidity is before draining, the higher the working load of the drainer.

The compensating load refers to the load brought to the compensator by compensating the thermal expansion and contraction of the pipeline. When the gas temperature data in the pipeline changes too much, and the pipeline stress data is relatively great, the compensator may have a greater compensating load. In some embodiments, the health state of the appurtenances may decline when the temperature changes too much and the thermal expansion and contraction of the pipeline is too much for the compensator to withstand.

In some embodiments, the data processing center may determine the draining load for the drainer based on the gas composition data and the gas temperature data. For example, the more impurities there are in the gas composition, the easier it may be for the impurities to gather as they pass through the drain channel, thereby blocking a drain channel and increasing the draining load. For another example, when the gas temperature is too low (e.g. below 0° C.), a moisture in the gas tends to condense, leading to block of the drainer and a higher draining load.

In some embodiments, the data processing center may determine the compensating load of the compensator based on the temperature within the gas pipeline. For example, when the temperature within the gas pipeline is repeatedly varied, the stress and a length of the gas pipeline may vary, resulting in an accelerated stress concentration loss in the compensator, and an increase in the compensating load.

In some embodiments, the data processing center may also determine a water condensation and an impurity aggregation in the drainer through a condensation model, and further determine the draining load of the drainer; the data processing center may determine the compensating load of the compensator through a feature of temperature variation in the gas pipeline and the pipeline data. More contents on this may be found in the related descriptions in FIG. 5.

In some embodiments, the data processing center may determine the drainer state based on the gas humidity data in a first associated pipeline associated with the drainer. More contents on this may be found in the related descriptions in FIG. 3.

In some embodiments, the data processing center may determine a fatigue degree and the compensating load of the compensator based on the gas temperature data and the pipeline stress data, and determine the compensator state based on the foregoing fatigue degree and the compensating load. More related contents may be found in the related description in FIG. 4.

Step 230, at least one maintenance parameter of the appurtenances may be determined based on the health state.

A maintenance parameter refers to a parameter related to performing a maintenance on appurtenances of a gas pipeline network. In some embodiments, the maintenance parameter may at least include a maintenance time, and a maintenance effort.

The maintenance time refers to an amount of time it takes to perform the maintenance on the appurtenances. The maintenance time may be usually set before an estimated failure time to avoid a failure of the appurtenances affecting the normal operation of the gas pipeline network.

The maintenance effort refers to an extent to which the appurtenances are maintained. In some embodiments, the maintenance effort may include a degree of maintenance operation required for the appurtenances and an experience requirement for maintenance personnel. The degree of maintenance operation requirement may include a low to high representation of operations of cleaning, maintaining, repairing, and replacing of the appurtenances. In some embodiments, the maintenance effort may be represented by numerical values and other forms that indicates the degree. The experience of the maintenance personnel may be related to a count of times the maintenance personnel performs a maintenance task, and the more times the maintenance personnel participates in the maintenance task, the more experienced the maintenance personnel, and the lower a probability of failure after maintenance. In some embodiments, the experience of the maintenance personnel may be expressed by a numerical value, with a greater value indicating that the maintenance personnel is more experienced.

In some embodiments, the maintenance time of the maintenance parameter of the appurtenances may be determined based on the estimated failure time, and the estimated failure time of the appurtenances may be queried based on the health state of the appurtenances through a preset table. The preset table refers to the data of the appurtenances indicating a failure in historical data, and the preset table may include the gas transportation data of the appurtenances before the failure, and the health state of the historically failed appurtenances at a plurality of historical moments, a time interval at which the failure of the appurtenances occurs at the plurality of historical moments, etc. A corresponding time interval at which the failure of the appurtenances occurs in the preset table may be queried through a current health state of the appurtenances, so as to determine the estimated failure time of the appurtenances. For example, a length of time between the moments when the health state is 90%, 80%, and 70% and the moment when the failure occurs may be used as the estimated failure time corresponding to the different health states.

In some embodiments, the data processing center may set the maintenance time before the predicted failure time. For example, the data processing center may set the maintenance time as 5 days before the estimated failure time, etc.

In some embodiments, the data processing center may set the maintenance effort based on the health state as well as an actual maintenance time. The setting of the maintenance effort may be negatively correlated with the health state of the appurtenances.

Step 240, a transportation parameter of the gas may be dynamically adjusted based on the health state and the at least one maintenance parameter, and at least one adjusted transportation parameter may be sent to the gas operation user platform.

The gas transportation parameter refers to a parameter of gas transportation in the pipeline, including at least one of a gas pressure, a flow volume, and a flow rate.

In some embodiments, the data processing center may appropriately reduce a gas transportation parameter, such as a gas transportation volume and a transportation speed of the appurtenances whose health state is lower than a safety alert line, so as to avoid failures of the appurtenances before the maintenance that affect the gas safety. The data processing center may also increase the transportation parameter of the associated gas pipeline to meet the gas supply demand.

The safety alert line refers to a health state warning value in the event of the failure of the appurtenances. For example, if the maximum health state of the appurtenances at the time of failure is 60% in the historical data, 60% may be used as a health state alert value.

In some embodiments, a magnitude of the adjustment when adjusting the gas transportation parameter may be set based on a difference between the current health state of the appurtenances and the health state alert value. The greater the health state exceeds the health state alert value, the smaller the magnitude of the adjustment.

In some embodiments, the data processing center may also determine an estimated probability of failure of the appurtenances, determine the maintenance parameter based on the estimated probability of failure. More on this may be found in the related description in FIG. 6.

Step 250, a maintenance program may be determined based on the maintenance parameter, and the adjusted transportation parameters, and the maintenance program may be uploaded to the government safety supervision and management platform.

The maintenance program refers to a program for the maintenance of the appurtenances. The maintenance program may include a maintenance plan for a plurality of appurtenances, safety measure during the maintenance, etc.

In some embodiments, the maintenance program may include the maintenance parameter and the maintenance time. The maintenance time may be determined based on the estimated probability of failure of the appurtenances at a future time, which typically requires the maintenance to be performed before a failure is likely to occur. The determination of the maintenance parameter may be found in the previous description. The appurtenances may be considered to be likely to fail when the estimated probability of failure meets a preset probability condition, and the preset probability condition may include a probability threshold determined based on actual experience.

In some embodiments, the safety measure at the time of maintenance may be determined by the data processing center based on a relevant processing specification. For example, a safety specification related to the current maintenance program may be read from the relevant processing specification and used as the safety measure.

In some embodiments, the data processing center may upload the maintenance program to the government safety supervision and management platform. By uploading the maintenance program, the data processing center may enable a government safety management user to perform a timely approvals of related operations as well as a safety supervision.

In some embodiments of the present disclosure, the data processing center may evaluate the health state of the appurtenances in the gas pipeline network by analyzing the gas data and the pipeline data in the gas pipeline network. By determining the maintenance parameter and formulating a maintenance plan based on the health state, a more effectively supervision on the health state of the appurtenances may be achieved, the possible failures of the appurtenances may be discovered in a timely manner, and the maintenance program may be reasonably planned to eliminate potential problems, which is conducive to ensuring the stability and safety of a gas supply.

Figure 3:
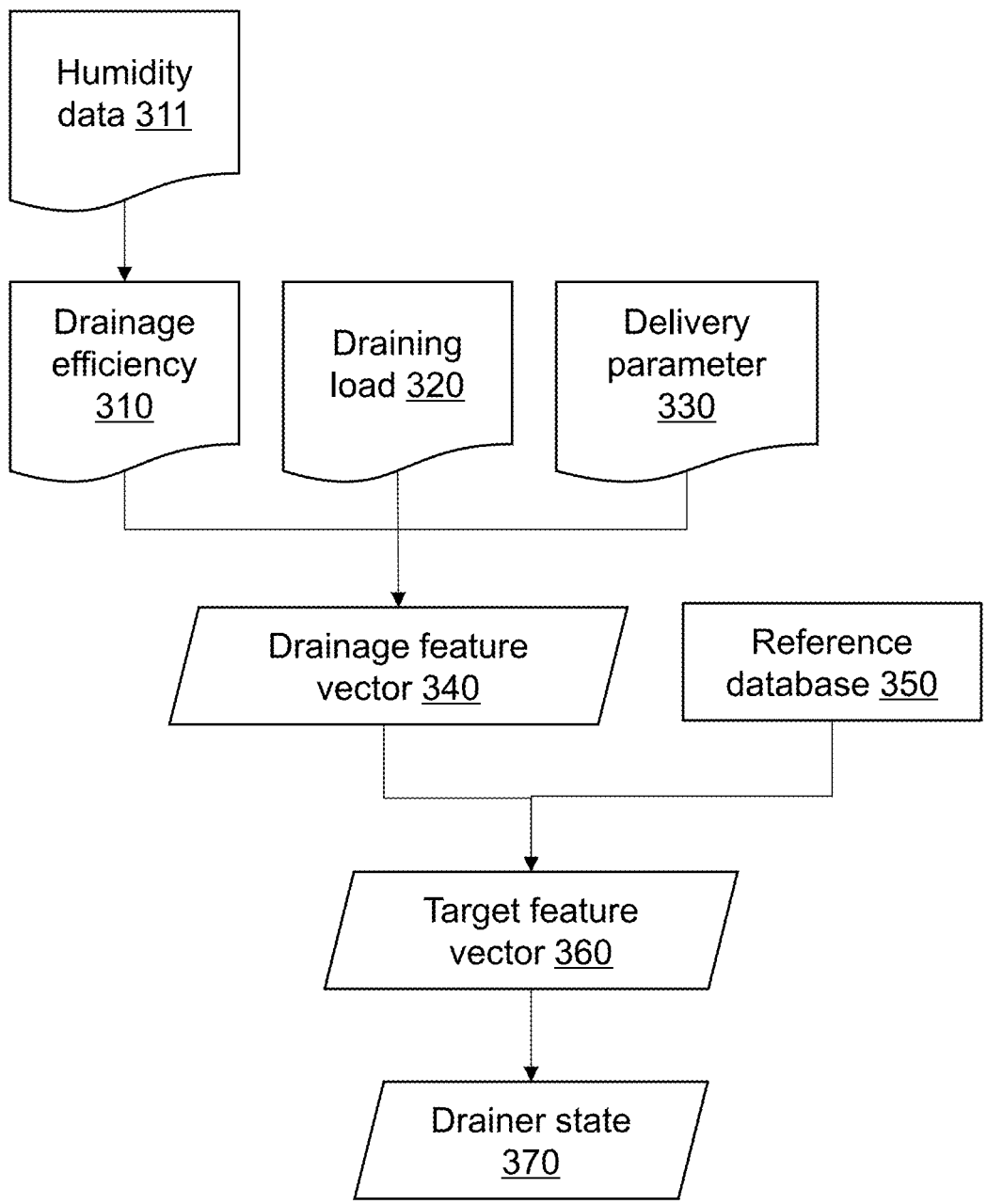
FIG. 3 is a schematic diagram illustrating a process for determining a drainer state according to some embodiments of the present disclosure.

FIG. 3 is a schematic diagram illustrating a process for determining a drainer state according to some embodiments of the present disclosure.

As shown in FIG. 3, in some embodiments, a data processing center may determine a drainage efficiency 310 of a drainer based on humidity data 311 of a gas in a first associated pipeline of the drainer; construct a drainage feature vector 340 based on the drainage efficiency 310, a draining load 320, and a delivery parameter 330 of the gas in the associated pipeline; and determine, based on the drainage feature vector 340, a target feature vector 360 in a reference database 350, and determine a drainer state 370 based on a reference state corresponding to the target feature vector.

Related definitions of the draining load 320, the humidity data 311, and the delivery parameter 330 may be found in the corresponding description of FIG. 2.

The first associated pipeline refers to an associated gas pipeline that is likely to influence the drain. In some embodiments, the first associated pipeline may include the gas pipeline upstream and downstream of the drain.

The drainage efficiency refers to a value that reflects a drainage effect of the drainer. The higher the drainage efficiency, the better the drainage of the drainer.

In some embodiments, the data processing center may determine the drainage efficiency based on the humidity data 311 of the gas in the first associated pipeline in a variety of ways. For example, the data processing center may determine the drainage efficiency based on a difference between the humidity data of the gas before and after passing through the drainer. A greater difference may indicate a higher amount of humidity discharged from the drainer, which indicates a higher drainage efficiency; the data processing center may also determine the drainage efficiency based on a difference between the gas humidity data after drainage and a target gas humidity data. A smaller difference may indicate that the closer the humidity after drainage is close to the target gas humidity, which indicates a higher drainage efficiency. The drainage efficiency may reach a maximum value when the gas humidity data after drainage reaches the target gas humidity data or is lower than the target gas humidity data.

In some embodiments, the drainage efficiency 310 may also be related to a distance between a humidity sensor and the drainer. The foregoing humidity sensor may be configured to monitor the gas humidity data within the gas pipeline.

In some embodiments, the data processing center may determine an efficiency correction factor based on the distance between the humidity sensor and the drainer. The greater the foregoing distance, the higher the efficiency correction factor. The efficiency correction factor may be a factor configured to correct the drainage efficiency.

In some embodiments, the data processing center may determine the drainage efficiency based on the efficiency correction factor. For example, the data processing center may multiply the efficiency correction factor with the drainage efficiency determined in the preceding section to obtain a corrected drainage efficiency.

In a process of transportation in the gas pipeline, the gas humidity data may increase due to a residual moisture in the pipeline itself, the further the distance from the humidity sensor, the greater the difference between the monitored gas humidity data and the humidity of the gas comes out of the drainer. At this time, the obtained gas humidity data may actually be higher than the humidity of the gas comes out of the drainer. Therefore, calculating the drainage efficiency based on the humidity data obtained from the humidity sensor at a greater distance may result in a lower drainage efficiency than the drainage efficiency calculated in the previous section.

In some embodiments of the present disclosure, the data processing center may correct the drainage efficiency by determining the efficiency correction factor based on the distance between the humidity sensor and the drainer, which makes the corrected drainage efficiency more in line with the reality, and is helpful for subsequently making a more accurate determination of the drainer state.

In some embodiments, the data processing center may construct a drainage feature vector 340 corresponding to the drainer based on the drainage efficiency 310, the draining load 320, and the delivery parameter 330 of the gas in the first associated pipeline.

In some embodiments, the data processing center may match the target feature vector 360 in the reference database 350 based on the drainage feature vector 340, and determine the reference state corresponding to the target feature vector 360 as the drainer state 370. The matching manner may be matching based on a similarity matching, and the similarity may be calculated through a Euclidean distance, a cosine similarity, etc.

The reference database 350 refers to a database for storing drainage-related reference data. In some embodiments, the reference database 350 may be constructed based on a historical maintenance record of the drainer, including at least one reference feature vector and the corresponding reference state. In some embodiments, the reference feature vector may include a historical drainage efficiency of the drainer, a historical draining load, and a historical gas transportation parameter within the first associated pipeline.

The target feature vector refers to a reference feature vector determined based on the reference database and meets a preset distance condition with the drainage feature vector. The preset distance condition may include the vector distance being minimized or the vector distance being less than a distance threshold, etc.

In some embodiments of the present disclosure, by determining a drainage efficiency based on gas humidity data, constructing the drainage feature vector in combination with the draining load and the transportation parameter, and determining, based on the drainage feature vector, the target feature vector by matching in a reference database, and further determining the drainer state, a more reasonable drainer state may be determined by combining the data related to the drainer at a current stage and the data related to the drainer in the historical record.

Figure 4:
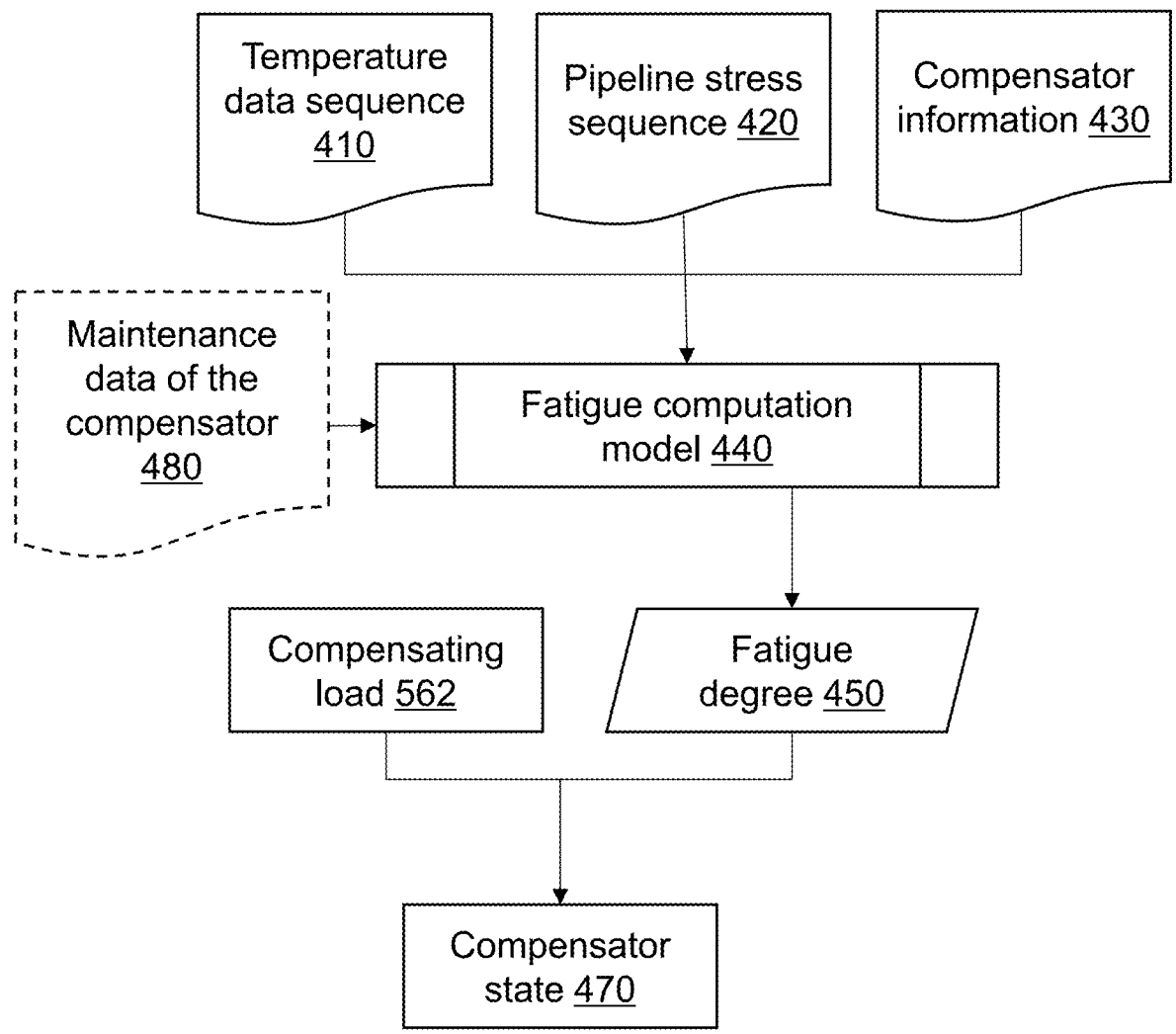
FIG. 4 is a schematic diagram illustrating a process for determining a compensator state according to some embodiments of the present disclosure.

FIG. 4 is a schematic diagram illustrating a process for determining a compensator state according to some embodiments of the present disclosure.

In some embodiments, an operating load 560 may also include a compensating load 562 of the compensator.

As shown in FIG. 4, in some embodiments, a data processing center may obtain a temperature data sequence 410 of the gas, and a pipeline stress sequence 420 of the gas from a data storage center of a gas company management platform; determine, by means of a fatigue computation model 440, a fatigue degree 450 of the compensator; and determine a compensator state 470 based on the fatigue degree 450 and the compensating load 562.

In some embodiments, the temperature data sequence 410 and the pipeline stress sequence 420 of the gas described above are the corresponding data over a compensation lifecycle.

Figure 5:
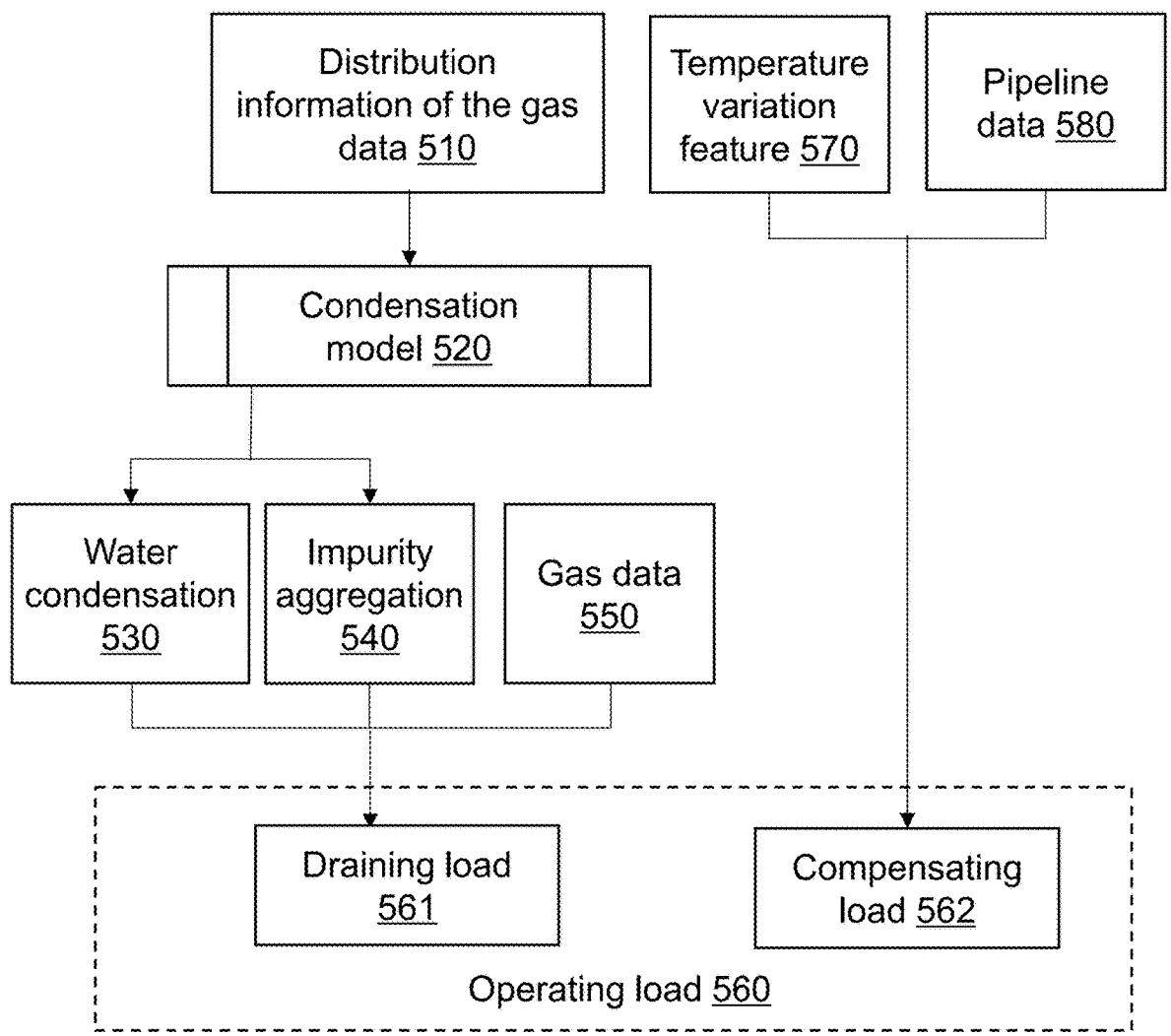
FIG. 5 is a schematic diagram illustrating a process for determining an operating load according to some embodiments of the present disclosure.

A definition of the compensating load 562 may be found in the corresponding description of FIG. 2, and a specific determination manner may be found in FIG. 5 and the related descriptions.

The compensation lifecycle refers to a time period from an installation moment of the compensator to the current moment.

The temperature data sequence 410 refers to a sequence formed by a plurality of gas temperature data. In some embodiments, the temperature data sequence 410 may include a plurality of gas temperature data, and a point in time corresponding to each data. A description of the gas temperature data may be found in the corresponding description of FIG. 2.

The pipeline stress sequence 420 refers to a sequence formed by a plurality of pipeline stress data. In some embodiments, the pipeline stress sequence 420 may include a plurality of pipeline stress data, and a point in time corresponding to each data. A description of the pipeline stress data may be found in the corresponding description of FIG. 2.

The fatigue degree 450 of the compensator refers to a degree of fatigue of the work of the compensator. A frequent change in the temperature of the gas in the pipeline may lead to repeated changes in the stress and a length of the gas pipeline, which increases the fatigue degree of the compensator. The higher the fatigue degree of the compensator, the higher a likelihood of deformation and fracture of the compensator.

In some embodiments, the data processing center may assess the fatigue degree 450 by fatigue testing. The fatigue testing refers to a testing using a stress measuring device, a deformation measuring device, a temperature monitoring device, etc., in order to obtain the stress and deformation of the compensator under a working load. However, the fatigue testing cannot be readily performed, and therefore a model may be required for the assessment.

In some embodiments, the data processing center may assess the fatigue degree 450 through the fatigue computation model 440. In some embodiments, the fatigue computation model 440 may be a machine learning model. For example, it may be a neural network (NN) model, a deep neural network (DNN) model, etc. . . .

An input of the fatigue computation model 440 may be the temperature data sequence 410, the pipeline stress sequence 420, and the compensator information 430, etc. of the gas pipeline, and an output may be the fatigue degree 450 of the compensator. The compensator information 430 refers to product information related to the compensator, which includes, for example, a specification, a material, a designed service life, etc., of the compensator.

In some embodiments, the fatigue computation model 440 may be obtained by training a great count of first training samples with first labels. The first training sample may include a sample temperature data sequence, a sample pipeline data sequence, and sample compensator information of the sample compensator in a preset historical time before the maintenance of the sample compensator. The preset historical time may be one week, one month, etc., before the maintenance is performed. The specifics may be determined according to the actual needs. The first training sample may be obtained from historical data. In some embodiments, the first label may be determined based on a historical actual detection result. For example, the first label of the first training sample may be a fatigue degree of the compensator detected in the history when the corresponding sample compensator was maintained.

In some embodiments, the input to the fatigue computation model 440 may also include a maintenance data of the compensator 480.

The maintenance data of the compensator 480 refers to related data when the compensator was historically maintained. In some embodiments, the maintenance data of the compensator 480 may include a maintenance parameter each time the compensator was historically maintained. A definition of the maintenance parameter may be found in the corresponding description of FIG. 2.

In some embodiments, when the input to the fatigue computation model 440 includes the maintenance data of the compensator 480, the corresponding first training sample during the model training process may also need to include the maintenance data of the sampled compensator in the history.

In some embodiments of the present disclosure, the data processing center, by inputting the maintenance data of the compensator 480 into the fatigue computation model, may take into account that the maintenance of the compensator slows down an accumulation of fatigue of the compensator, which in turn affects the fatigue degree, and makes the fatigue computation model to assess the fatigue degree more accurately and more in line with the actual situation.

In some embodiments, the data processing center may determine the compensator state 470 in a variety of ways based on the fatigue degree 450 and the compensating load 562. For example, a preset table corresponding to the compensator state may be constructed based on the fatigue degree and the compensating load in the historical data, and the current fatigue degree 450 and the compensating load 562 may be utilized to determine the corresponding compensator state 470 by querying the preset table; or a weighted summation may be performed on the fatigue degree 450 and the compensating load 562 to determine the compensator state 470, a weight of the weighted summation may be manually preset.

In some embodiments of the present disclosure, the data processing center may evaluate the fatigue degree of the compensator through the fatigue computation model based on the temperature data sequence, the pipeline stress sequence, and the information of the compensator of the gas pipeline, and then evaluate the compensator state by combining the compensating load. In this way, the temperature, stress and the actual condition of the compensator in the gas pipeline can be considered comprehensively, and the state of the compensator may be evaluated accurately and reasonably.

FIG. 5 is a schematic diagram illustrating a process for determining an operating load according to some embodiments of the present disclosure.

As shown in FIG. 5, in some embodiments, the data processing center may assess a water condensation 530 and an impurity aggregation 530 in the drainer by a condensation model 520 based on distribution information 510 of gas data in an upstream pipeline of the drainer; determine a draining load 561 of the drainer based on the water condensation 530, an impurity aggregation 540, and gas data 550; and assess a compensating load 562 of the compensator based on a temperature variation feature 570 of the gas in a second associated pipeline, and the pipeline data 580.

Descriptions related to the gas data, the draining load, the compensating load, and the pipeline data may be found in the relevant descriptions of FIG. 2.

The distribution information of the gas data 510 refers to a distribution of the associated gas data at a plurality of points. For example, the distribution information of the gas data in the upstream pipeline of the drainer may include the distribution of the gas temperature, humidity, gas composition, and other data in an upstream of the drainer at the plurality of points, which may be obtained by sensors at the plurality of points in the gas pipeline, such as a temperature sensor, a humidity sensors, etc., and the specific content of the sensors may be found in the relevant description of FIG. 1.

The water condensation 530 refers to data reflecting a condensation of water at the drainer. For example, the water condensation condition 530 may be a volume of ice condensed at the drainer.

The impurity aggregation 540 refers to data reflecting the aggregation of impurities at the drainer. For example, the impurity aggregation 540 may include a volume and concentration of the aggregated impurities, etc.

In some embodiments, the data processing center may determine the water condensation and the impurity aggregation of the drainer through the condensation model 520. In some embodiments, the condensation model 520 may be a machine learning model, e.g., an NN model, a DNN model.

An inputs to the condensation model 520 may be the distribution information of the gas data 510, and an output may be the water condensation 530 and the impurity aggregation 540.

In some embodiments, the condensation model 520 may be obtained by training a great count of second training samples with second labels. The second training sample may include the distribution information of sample gas data, which is obtained from historical data. The second label may be actual water condensation and impurity aggregation corresponding to the second training sample, and may be, for example, a volume of ice condensed in the drainer, and the aggregated impurities of the drainer corresponding to the distribution information of the sample gas data, etc.

In some embodiments, the data processing center may determine the draining load 561 in a variety of ways based on the water condensation condition 530, the impurity aggregation condition 540, and the gas data 550. For example, the more severe the water condensation and the impurity aggregation, the more difficult it is to discharge water and impurities during an operation of the drainer, the higher the draining load. The gas data may include gas humidity data and gas flow rate data, and the higher the gas humidity and the higher the gas flow volume, the higher the draining load.

Merely as an example, the draining load 561 may be determined by the following equation (1):

$$P = h * f * (s+z) \qquad (1)$$

where P denotes the draining load, h denotes the gas humidity, f denotes the gas flow volume, s denotes the water condensation, and z denotes the impurity aggregation.

In some embodiments, if the above relationship between the gas data, the water condensation, the impurity aggregation, and the draining load is met, the draining load may also be calculated by other reasonable equation.

The second associated pipeline refers to an associated gas pipeline that is likely to influence the compensator. In some embodiments, the second associated pipeline may include an upstream gas pipeline of the compensator.

A temperature variation feature 570 refers to data that reflects a change feature of the gas temperature data within the pipeline relative to a room temperature. For example, the temperature variation feature 570 may include a magnitude of change of the gas temperature data relative to the room temperature and a length of time of the change. The room temperature may be the temperature at which the compensator is in equilibrium, when the temperature is above the room temperature, the pipeline may expand with heat and the compensator may compress, and when the temperature is below the room temperature, the pipeline may contract with coldness and the compensator may elongate. The length of time of change refers to a time it takes for the gas temperature to change from the room temperature to the current temperature.

In some embodiments, the data processing center may determine the compensating load 562 in a variety of ways based on the temperature variation feature 570 of the second associated pipeline and the pipeline data 580. For example, the greater the magnitude of change and the longer the length of time of change in the temperature variation feature, the higher the compensating load, and the greater a factor of thermal expansion of the pipeline material (which is obtained based on a priori knowledge) and the longer the length of the pipeline in the pipeline data, the higher the compensating load.

Merely as an example, the compensating load 562 may be determined by equation (2) below:

$$B = \Delta T \times t \times k \times l \qquad (2)$$

where B denotes the compensating load, $\Delta T$ denotes the magnitude of change in temperature, t denotes the length of time of change in temperature, k denotes the factor of thermal expansion of the pipeline, and l is the length of the pipeline.

In some embodiments, if the above relationship between the temperature variation feature, the pipeline data, and the compensating load is met, the compensating load may also be calculated by other reasonable equation.

In some embodiments of the present disclosure, by evaluating water condensation and the impurity aggregation in the drainer through a condensation model based on the distribution information of the gas data, and determining the draining load of the drainer based on the gas data, the draining load of the drainer may be more accurately assessed; by determining the compensating load based on the temperature variation feature of the second associated pipeline and the pipeline data, a more realistic compensating load may be obtained based on the feature of the pipeline associated with the compensator.

Figure 6:
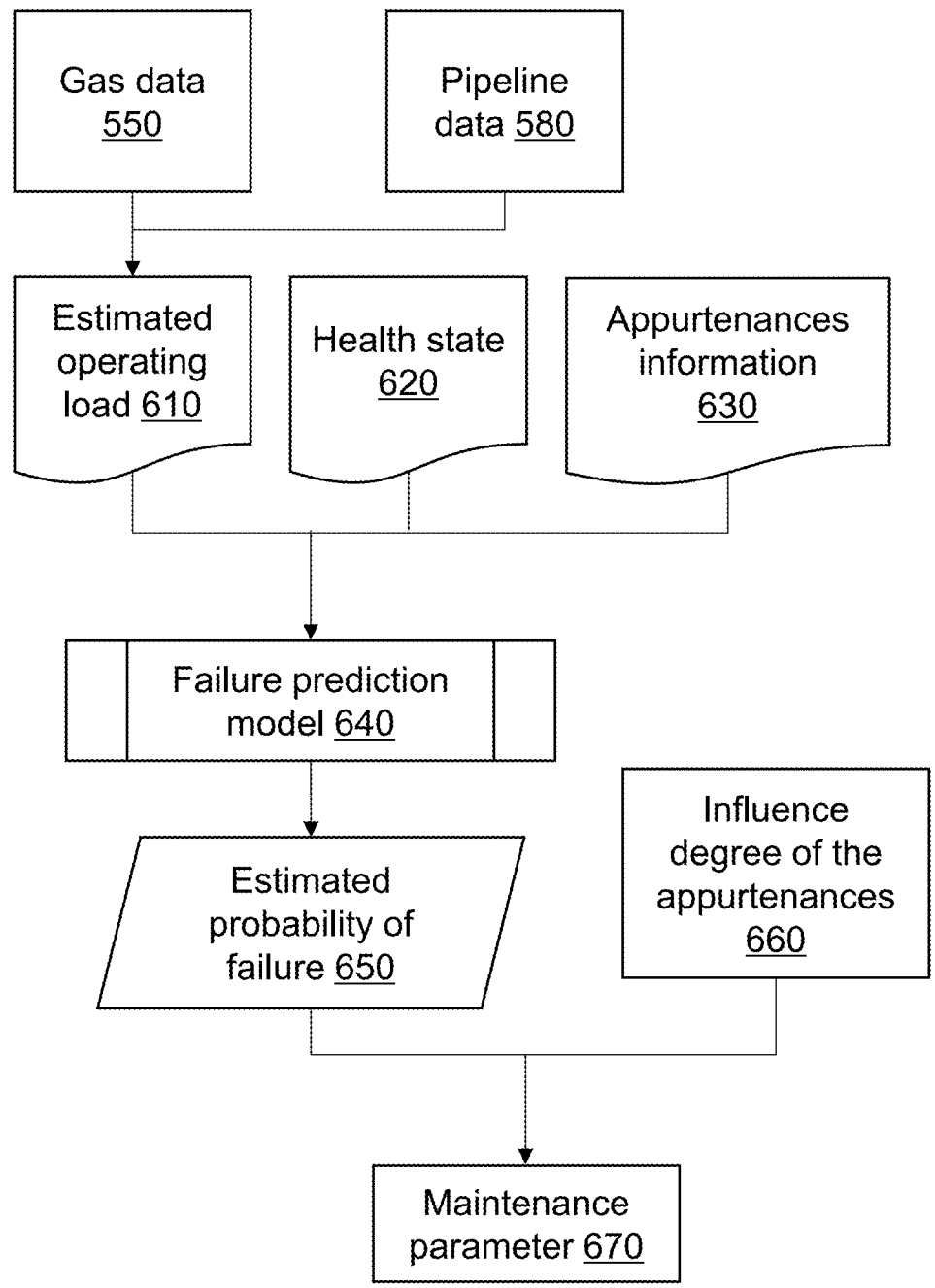
FIG. 6 is a schematic diagram illustrating a process for determining maintenance parameter according to some embodiments of the present disclosure.

FIG. 6 is a schematic diagram illustrating a process for determining maintenance parameter according to some embodiments of the present disclosure.

As shown in FIG. 6, in some embodiments, the data processing center may assess an estimated operating load 610 of appurtenances in a future time period based on the gas data 550 and the pipeline data 580; predict an estimated probability of failure 650 of the appurtenances in the future period of time by a failure prediction model 640 based on a health state 620, the estimated operating load 610, and appurtenances information 630; and determine a maintenance parameter 670 based on the estimated probability of failure 650, and an influence degree of the appurtenances 660 influence.

For definitions related to the gas data, the pipeline data, the appurtenances, the health state, and the maintenance parameter, please refer to the corresponding descriptions in FIG. 2.

The estimated operating load 610 refers to the estimated operating load at a future time period. The future time period may be a time period in the future of a preset length of time, e.g., if the preset length of time is 1 hour, the future time period may be 8:00~9:00 one day after the current time. For a definition of the operating load, please refer to the related description of FIG. 2.

In some embodiments, the data processing center may predict the gas data and the pipeline data for a future time period based on the historical gas data, the historical pipeline data in various ways. For example, the data processing center may predict the gas data and the pipeline data for a future time periods by inputting the historical gas data and the historical pipeline data into a time series model (e.g., a long short term memory (LSTM) model, an auto regressive moving average (ARMA) model, etc.); or, for example, the data processing center may directly calculate a mean value of the gas data and the pipeline data of the corresponding time period in the historical data as the gas data and the pipeline data for the future period.

In some embodiments, the data processing center may evaluate the estimated operating load based on the estimated gas data and the estimated pipeline data in the future time period, and the evaluation manner may be similar to the way of determining the operating load, as described in detail in FIG. 5 and the related descriptions.

The estimated probability of failure 650 refers to the estimated probability of failure of the appurtenances in a future time period. In some embodiments, the estimated probability of failure 650 may be a sequence of probabilities of failure of the appurtenances at a plurality of future time periods, for example, it may be [(T1,P1), (T2,P2), . . . ], where P1 denotes the probability of failure of the appurtenances at a future time period T1.

In some embodiments, the data processing center may predict the estimated probability of failure based on the failure prediction model 640. In some embodiments, the failure prediction model 640 may be a machine learning model, e.g., an NN model, a recurrent neural network (RNN) model, etc. An input to the failure prediction model 640 may be the appurtenances information 630, the health state 620, and the estimated operating load 610, and an output may be the estimated probability of failure 650. The appurtenances information refers to information about the appurtenances, e.g., an appurtenances type (e.g., a compensator, a drainer), a specification of the appurtenances, etc.

In some embodiments, the failure prediction model 640 may be obtained by training a great count of third training samples with third labels. Each group of the third training samples may include sample appurtenances information, a sample health state, and a sample operating load. The third training sample may be obtained from historical data. The third label may be labeled based on actual failures of the appurtenances in a plurality of historical time periods subsequent to the time period corresponding to the third training sample in the historical data. For example, the probability of failure for a time period in which the failure occurs may be set to 1, and the probability of failure for the time period in which a failure does not occur may be set to 0. The trained model in this way may output a value between 0 and 1 for each future time period separately as the probability of failure for the future time period.

The influence degree of the appurtenances 660 refers to an influence on a gas supply in the event of appurtenances failure.

In some embodiments, the data processing center may determine the influence degree of the appurtenances based on a pipeline grade of the gas pipeline in which the appurtenances is located, the gas flow rate, and gas users radiated downstream of the appurtenances. The higher the pipeline grade, the higher the gas flow rate, and the greater the count of gas users, then the higher the influence degree of the appurtenances. For example, the data processing center may obtain the influence degree of the appurtenances by performing a weighted summation on the pipeline grade of the gas pipeline in which the appurtenances is located, the gas flow rate, and the count of gas users radiated downstream of the appurtenances, or another reasonable calculation may be performed.

The pipeline grade indicates different pipeline branches, e.g., main pipelines, primary branches, secondary branches, etc. The primary branch refers to a branch that extends from the main pipeline, and the secondary branch refers to a branch that extends from the primary branch.

In some embodiments, the influence degree of the appurtenances 660 may also include a linkage influence degree. The linkage influence degree refers to the degree of influence of a failure of the appurtenances on the health state of other appurtenances.

In some embodiments, the data processing center may: construct a linkage influence map based on a gas pipeline network map, and a distribution feature of the appurtenances; and determine the linkage influence degree based on the linkage influence map by means of an influence assessment model.

The gas pipeline network map refers to a map reflecting the distribution of the gas pipeline network and may be configured to represent a layout of the gas pipeline. In some embodiments, the gas pipeline network map may be obtained from a data storage center.

The distribution feature of the appurtenances refers to a distribution of the appurtenances relative to the gas pipeline network. For example, the distribution feature of the appurtenances may be that the drainer is located at a low point of the gas pipeline.

The linkage influence map refers to a map that reflects the distribution of the appurtenances and the gas pipeline network. The linkage influence map may include nodes and edges, with the nodes indicating the appurtenances, e.g., the nodes may include drainer nodes, compensator nodes, etc., and the edges indicating the gas pipeline between the appurtenances. The edges may have a directions, the directions of the edges indicating the directions of the gas transportation. In some embodiments, a node feature may include a type of appurtenances, a location of the appurtenances, and an edge feature may include the pipeline data, the gas data of the gas pipeline. The related descriptions of the pipeline data and the gas data may be referred to in the corresponding description of FIG. 2.

In some embodiments, the nodes of the linkage influence map may include at least one of the drainer node and the compensator node. The node feature of the drainer node may include a drainage efficiency of the drainer and the node feature of the compensator node may include a fatigue degree of the compensator.

The relevant descriptions of the drainage efficiency of the drainer may be found in FIG. 3, and the relevant descriptions of the fatigue degree of the compensator may be found in the corresponding descriptions of FIG. 4.

In an actual gas transmission process, as a drainage function not completed by the upstream needs to be borne by the downstream, the poorer the drainage efficiency, the heavier a burden of the downstream drainer. At the same time, the higher the fatigue degree of the compensator, the poorer the compensation effect, and the more the other appurtenances are needed to share the burden, therefore, the drainage efficiency of the drain and the fatigue degree of the compensator may affect the linkage influence degree of the appurtenances.

In some embodiments of the present disclosure, by using the drainage efficiency of the drain and the fatigue degree of the compensator as the node feature of the drainer node and the compensator node, respectively, the linkage influence map may better reflect the influence among the appurtenances, which makes the linkage influence assessed based on the linkage influence map more in line with the actual situation.

In some embodiments, the data processing center may assess the linkage influence degree of the appurtenances based on the influence assessment model. In some embodiments, the influence assessment model may be a machine learning model, e.g., the influence assessment model may be a Graph Neural Networks (GNN) model. An input to the influence assessment model may be a linkage influence map, and an output may be a linkage influence degree of the appurtenances for each node.

In some embodiments, the influence assessment model may be obtained by training based on a great count of fourth training samples with fourth labels. The fourth training sample may be a sample linkage image map constructed based on historical data. The fourth label may be labeled based on the influences of different appurtenances in the sample linkage image map when failure actually occurs. The manner of determining the health state of the downstream appurtenances may be referred to in the descriptions in the corresponding sections of FIG. 2 and FIG. 3.

In some embodiments of the present disclosure, the data processing center may construct the linkage influence map, and assess the linkage influence degree of the appurtenances by the influence assessment model, so that the influences of the failure of the appurtenances on the other appurtenances may be more accurately assessed, which facilitates the subsequent determination of more reasonable maintenance parameters for better maintenance management of the appurtenances.

In some embodiments, the data processing center may determine the maintenance parameter 670 by: determining a maintenance time in accordance with the method for determining the maintenance time as shown in FIG. 2; and adjusting the maintenance time based on the influence degree of the appurtenances and determining the maintenance effort. For example, when the influence degree of the appurtenances exceeds a preset threshold of influence, the maintenance time may be advanced based on a difference between the influence degree of the appurtenances and the threshold of influence, and the greater the aforesaid difference is, the more the time is advanced. The higher the influence degree of the appurtenances, the higher a level of maintenance and the more experienced the maintenance personnel.

In some embodiments of the present disclosure, the data processing center may estimate the operating load, combine the health state and the appurtenances information, and use the failure prediction model to predict the estimated probability of failure. Then, the data processing center may determine the maintenance parameter in combination with the influence degree of the appurtenances. The data processing center may determine a more effective maintenance parameter by predicting future failure conditions and evaluating the influence caused by the future failure conditions, making maintenance management more reasonable.

The basic concepts have been described above, and it is apparent to those skilled in the art that the foregoing detailed disclosure is intended as an example only and does not constitute a limitation of the present disclosure. While not expressly stated herein, those skilled in the art may make various modifications, improvements, and amendments to the present disclosure. These modifications, improvements, and amendments are suggested in the present disclosure, so these types of modifications, improvements, and amendments remain within the spirit and scope of the exemplary embodiments of the present disclosure.

Also, the present disclosure uses specific words to describe embodiments of the present disclosure, such as "an embodiment," "one embodiment," and/or "some embodiments" means a feature, structure, or characteristic associated with at least one embodiment of the present disclosure. Accordingly, it should be emphasized and noted that two or more references in the present disclosure, at different locations, to "one embodiment" or "an embodiment" or "an alternative embodiment" in different places in the present disclosure do not necessarily refer to the same embodiment. In addition, certain features, structures, or characteristics in one or more embodiments of the present disclosure may be suitably combined.

Similarly, it should be noted that in order to simplify the presentation of the disclosure of the present disclosure, and thereby aiding in the understanding of one or more embodiments of the present disclosure, the foregoing descriptions of embodiments of the present disclosure sometimes combine a variety of features into a single embodiment, accompanying drawings, or descriptions thereof. description thereof. However, this method of disclosure does not imply that the objects of the present disclosure require more features than those mentioned in the claims. Rather, claimed subject matter may lie in less than all features of a single foregoing disclosed embodiment.

For each of the patents, patent applications, patent application disclosures, and other materials cited in the present disclosure, such as articles, books, specification sheets, publications, documents, etc., are hereby incorporated by reference in their entirety into the present disclosure. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions and/or use of terms in the present disclosure shall prevail.

Finally, it should be understood that the embodiments described in the present disclosure are only configured to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for managing safety maintenance of appurtenances of a smart gas pipeline network, wherein the method is executed by a data processing center of a gas company management platform in an Internet of Things (IoT) system for managing safety maintenance of appurtenances of the smart gas pipeline network, and the method comprises:
   obtaining at least one of gas data and pipeline data based on a gas device object platform;
   assessing a health state of the appurtenances based on at least one of the gas data and the pipeline data, comprising:
      determining an operating load of the appurtenances based on at least one of the gas data and the pipeline data; and
      determining the health state of the appurtenances based on the operating load, the operating load including a draining load of a drainer and a compensating load of a compensator;
   the health state including at least one of a drainer state and a compensator state; wherein
   determining the drainer state comprises:
      determining a drainage efficiency of the drainer based on humidity data of the gas in a first associated pipeline of the drainer;

constructing a drainage feature vector based on the drainage efficiency, the draining load, and a delivery parameter of the gas in the first associated pipeline; and determining a target feature vector in a reference database based on the drainage feature vector, and determining the drainer state based on a reference state corresponding to the target feature vector; wherein the reference database is constructed based on a historical maintenance record of the drainer, and the reference database includes at least one reference feature vector and the corresponding reference state, elements of the reference feature vector including a historical drainage efficiency, a historical draining load, and a historical delivery parameter;

determining the compensator state comprises:

obtaining a temperature data sequence of the gas and a pipeline stress sequence from a data storage center of the gas company management platform; and determining a fatigue degree of the compensator based on the temperature data sequence and the pipeline stress sequence by a fatigue computation model; and determining the compensator state based on the fatigue degree and the compensating load; and determining the health state of the appurtenances by a weighted summation based on values of the drainer state and the compensator state;

determining at least one maintenance parameter of the appurtenances based on the health state, comprising:

assessing an estimated operating load of the appurtenances in a future period of time based on the gas data and the pipeline data;

predicting an estimated probability of failure of the appurtenances in the future period of time by a failure prediction model based on the health state of the appurtenances, the estimated operating load, and appurtenance structure information, the failure prediction model being a machine learning model; and determining the at least one maintenance parameter based on the estimated probability of failure and an influence degree of the appurtenances; wherein the influence degree of the appurtenances indicates a degree of influence of a failure of the appurtenances on gas supply;

dynamically adjusting at least one transportation parameter of gas based on the health state and the at least one maintenance parameter; sending at least one adjusted transportation parameter to a gas operation user platform; and determining a maintenance program based on the at least one maintenance parameter and the at least one adjusted transportation parameter, and uploading the maintenance program to a government safety supervision and management platform, wherein the gas operation user platform controls operation of the gas pipeline network based on the at least one adjusted transportation parameter.

2. The method of claim 1, wherein the determining an operating load of the appurtenances based on at least one of the gas data and the pipeline data, includes:

assessing a water condensation and an impurity aggregation in the drainer by a condensation model based on distribution information of the gas data in an upstream pipeline of the drainer, the condensation model being a machine learning model;

determining the draining load of the drainer based on the water condensation, the impurity aggregation, and the gas data; and assessing the compensating load of the compensator based on a temperature variation feature of gas in a second associated pipeline and the pipeline data, the second associated pipeline including an upstream gas pipeline of the compensator.

3. An Internet of Things (IoT) system for managing a safety maintenance of appurtenances of a smart gas pipeline network, wherein the IoT system includes a gas operation user platform, a gas user service platform, a government safety supervision and management platform, a gas company management platform, a gas company sensor network platform, and a gas device object platform, and the gas company management platform includes a data processing center and a data storage center, wherein the data processing center is configured to:

obtain at least one of gas data and pipeline data based on the gas device object platform;

assess a health state of the appurtenances based on at least one of the gas data and the pipeline data, comprising:

determining an operating load of the appurtenances based on at least one of the gas data and the pipeline data; and determining the health state of the appurtenances based on the operating load, the operating load including a draining load of a drainer and a compensating load of a compensator;

the health state including at least one of a drainer state and a compensator state; wherein determining the drainer state comprises:

determining a drainage efficiency of the drainer based on humidity data of the gas in a first associated pipeline of the drainer;

constructing a drainage feature vector based on the drainage efficiency, the draining load, and a delivery parameter of the gas in the first associated pipeline; and determining a target feature vector in a reference database based on the drainage feature vector, and determining the drainer state based on a reference state corresponding to the target feature vector; wherein the reference database is constructed based on a historical maintenance record of the drainer, and the reference database includes at least one reference feature vector and the corresponding reference state, elements of the reference feature vector including a historical drainage efficiency, a historical draining load, and a historical delivery parameter;

determining the compensator state comprises:

obtaining a temperature data sequence of the gas and a pipeline stress sequence from a data storage center of the gas company management platform; and determining a fatigue degree of the compensator based on the temperature data sequence and the pipeline stress sequence by a fatigue computation model; and determining the compensator state based on the fatigue degree and the compensating load; and determining the health state of the appurtenances by a weighted summation based on values of the drainer state and the compensator state;

determine at least one maintenance parameter of the appurtenances based on the health state, comprising:

assessing an estimated operating load of the appurtenances in a future period of time based on the gas data and the pipeline data;

predicting an estimated probability of failure of the appurtenances in the future period of time by a failure prediction model based on the health state of the appurtenances, the estimated operating load, and appurtenance structure information, the failure prediction model being a machine learning model; and determining the at least one maintenance parameter based on the estimated probability of failure and an influence degree of the appurtenances; wherein the influence degree of the appurtenances indicates a degree of influence of a failure of the appurtenances on gas supply;

dynamically adjust at least one transportation parameter of gas based on the health state and the at least one maintenance parameter; send at least one adjusted transportation parameter to the gas operation user platform; and determine a maintenance program based on the at least one maintenance parameter and the at least one adjusted transportation parameter, and upload the maintenance program to the government safety supervision and management platform, wherein the gas operation user platform controls operation of the gas pipeline network based on the at least one adjusted transportation parameter.

4. The IoT system of claim 3, wherein the gas company management platform is configured to obtain the at least one of the gas data and the pipeline data from the gas device object platform through the gas company sensor network platform.

5. The IoT system of claim 4, wherein the data processing center is further configured to:

assess a water condensation and an impurity aggregation in the drainer by a condensation model based on distribution information of the gas data in an upstream pipeline of the drainer, the condensation model being a machine learning model;

determine the draining load of the drainer based on the water condensation, the impurity aggregation, and the gas data; and assess the compensating load of the compensator based on a temperature variation feature of gas in a second associated pipeline and the pipeline data, the second associated pipeline including an upstream gas pipeline of the compensator.

* * * * *